United States Patent
Sugiyama et al.

(10) Patent No.: US 10,942,396 B2
(45) Date of Patent: *Mar. 9, 2021

(54) DISPLAY DEVICE

(71) Applicant: Japan Display Inc., Minato-ku (JP)

(72) Inventors: Hiroki Sugiyama, Minato-ku (JP);
Kentaro Okuyama, Minato-ku (JP);
Hideki Kaneko, Minato-ku (JP);
Hiroshi Inamura, Minato-ku (JP);
Manabu Mizuno, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/863,059

(22) Filed: Apr. 30, 2020

(65) Prior Publication Data

US 2020/0257168 A1 Aug. 13, 2020

Related U.S. Application Data

(63) Continuation of application No. 16/573,212, filed on Sep. 17, 2019, now Pat. No. 10,684,510, which is a
(Continued)

(30) Foreign Application Priority Data

Mar. 15, 2016 (JP) .................................. 2016-051426
Feb. 23, 2017 (JP) .................................. 2017-032338

(51) Int. Cl.
*G02F 1/13357* (2006.01)
*G02F 1/1334* (2006.01)
(Continued)

(52) U.S. Cl.
CPC ......... *G02F 1/133615* (2013.01); *G02B 6/00* (2013.01); *G02B 6/0023* (2013.01);
(Continued)

(58) Field of Classification Search
CPC ..... G02F 2001/133616; G02F 1/13454; G02F 1/13458; G02F 2001/133614; G02F 1/133504; G02B 6/0068; G02B 26/00
See application file for complete search history.

(56) References Cited

U.S. PATENT DOCUMENTS 10,684,510 B2* 6/2020 Sugiyama ........... G02F 1/13458
2009/0185394 A1 7/2009 Takahashi
(Continued)

FOREIGN PATENT DOCUMENTS

JP 7-56169 A 3/1995
JP 8-313973 A 11/1996
(Continued)

OTHER PUBLICATIONS

U.S. Appl. No. 15/664,780, filed Jul. 31, 2017, Manabu Mizuno, et al. (publication date not available, submitting filing date of application).
(Continued)

*Primary Examiner* — Jessica M Merlin
(74) *Attorney, Agent, or Firm* — Oblon, McClelland, Maier & Neustadt, L.L.P.

(57) ABSTRACT

A display device according to one aspect of the present invention includes a first substrate including a pixel portion and a terminal portion, a second substrate arranged to face the pixel portion, a first light source device arranged in the terminal portion, and irradiating a first end surface of the second substrate with first light, a liquid crystal layer arranged between the first substrate and the second substrate, and a semiconductor element arranged on a side opposite to a side of the pixel portion across the first light source device, and electrically coupled with the terminal portion, wherein the first light is propagated while reflected between the first
(Continued)

substrate and the second substrate, and the liquid crystal layer modulates the propagated first light.

4 Claims, 11 Drawing Sheets

Related U.S. Application Data continuation of application No. 15/454,161, filed on Mar. 9, 2017, now Pat. No. 10,466,538.

(51) Int. Cl.
*G02F 1/1345* (2006.01)
*G02B 6/00* (2006.01)
*F21V 8/00* (2006.01)
*G02F 1/1335* (2006.01)

(52) U.S. Cl.
CPC ......... *G02B 6/0031* (2013.01); *G02B 6/0068* (2013.01); *G02F 1/1334* (2013.01); *G02F 1/13454* (2013.01); *G02F 1/13458* (2013.01); *G02F 1/133504* (2013.01); *G02F 2001/133616* (2013.01)

(56) References Cited

U.S. PATENT DOCUMENTS

| | | |
|---|---|---|
| 2011/0109829 A1 | 5/2011 | Mathew et al. |
| 2011/0149201 A1 | 6/2011 | Powell et al. |
| 2012/0098875 A1 | 4/2012 | Shinkai et al. |
| 2012/0182763 A1 | 7/2012 | Masuji |
| 2012/0224122 A1 | 9/2012 | Koganezawa |
| 2014/0055835 A1 | 2/2014 | Shinkai et al. |
| 2014/0240642 A1 | 8/2014 | Furukawa et al. |
| 2015/0293402 A1 | 10/2015 | Shinkai et al. |
| 2017/0160592 A1 | 6/2017 | Okuyama |
| 2017/0269433 A1 | 9/2017 | Sugiyama et al. |
| 2017/0285420 A1 | 10/2017 | Okuyama et al. |

FOREIGN PATENT DOCUMENTS

| | | |
|---|---|---|
| JP | 11-183888 A | 7/1999 |
| JP | 11-183902 A | 7/1999 |
| JP | 2000-250031 | 9/2000 |
| JP | 2001-264790 A | 9/2001 |
| JP | 2004-309774 | 11/2004 |
| JP | 3697925 | 9/2005 |
| JP | 2012-150946 | 8/2012 |
| JP | 2012-185934 | 9/2012 |

OTHER PUBLICATIONS

Office Action dated Sep. 1, 2020 in the corresponding Japanese Patent Application No. 2017-032338 (with English Translation), citing documents AO-AS therein, 8 pages.

\* cited by examiner

DISPLAY DEVICE

CROSS-REFERENCE TO RELATED APPLICATIONS

This application is a continuation of U.S. application Ser. No. 16/573,212 filed Sep. 17, 2019, which is a continuation of U.S. application Ser. No. 15/454,161 filed Mar. 9, 2017, which claims priority from Japanese Application No. 2016-051426, filed on Mar. 15, 2016, and Japanese Application No. 2017-032338, filed on Feb. 23, 2017, the contents of each of which are incorporated by reference herein in its entirety.

BACKGROUND

1. Technical Field

The present disclosure relates to a display device.

2. Description of the Related Art

As edge light display devices, display devices described in Japanese Patent No. 3697925, Japanese Patent Application Laid-open Publication No. 2004-309774, Japanese Patent Application Laid-open Publication No. 2012-150946 (JP-A-2012-150946), and Japanese Patent Application Laid-open Publication No. 2012-185934 (JP-A-2012-185934) are known. In these display devices, a light source device is arranged in an end portion of a light-guiding plate, and light radiated from the light source device is propagated inside the light-guiding plate and is expanded in a plane manner. To increase brightness of display, the light source devices are provided to a plurality of sides of the light-guiding plate (see JP-A-2012-150946 and JP-A-2012-185934).

If a semiconductor element such as an IC chip exists near the light source devices, the semiconductor element may malfunction due to strong light from the light source devices. Therefore, the light source device is favorably not arranged in a terminal portion where the semiconductor element is arranged. However, this configuration significantly limits arrangement of the light source devices.

SUMMARY

A display device according to one aspect of the present invention includes a first substrate including a pixel portion and a terminal portion, a second substrate arranged to face the pixel portion, a first light source device arranged in the terminal portion, and irradiating a first end surface of the second substrate with first light, a liquid crystal layer arranged between the first substrate and the second substrate, and a semiconductor element arranged on a side opposite to a side of the pixel portion across the first light source device, and electrically coupled with the terminal portion, wherein the first light is propagated while reflected between the first substrate and the second substrate, and the liquid crystal layer modulates the propagated first light.

DETAILED DESCRIPTION

Forms for implementing the invention (embodiments) will be described in detail with reference to the drawings. The present invention is not limited by content described in the embodiments below. Configuration elements described below include elements easily conceived by a person skilled in the art and elements substantially the same. Further, the configuration elements described below can be appropriately combined. The disclosure is merely an example, and appropriate modifications which maintain the points of the invention, and which can be easily arrived at by a person skilled in the art, are obviously included in the scope of the present invention. To make description more clear, the drawings may be schematically illustrated in the width, thickness, shape, and the like of respective portions, compared with actual forms. However, such illustration is merely an example, does not limit the construction of the present invention. In the present specification and drawings, elements similar to those described with respect to the drawings that have already been mentioned are denoted with the same reference signs, and detailed description may be appropriately omitted.

First Embodiment

Figure 1:
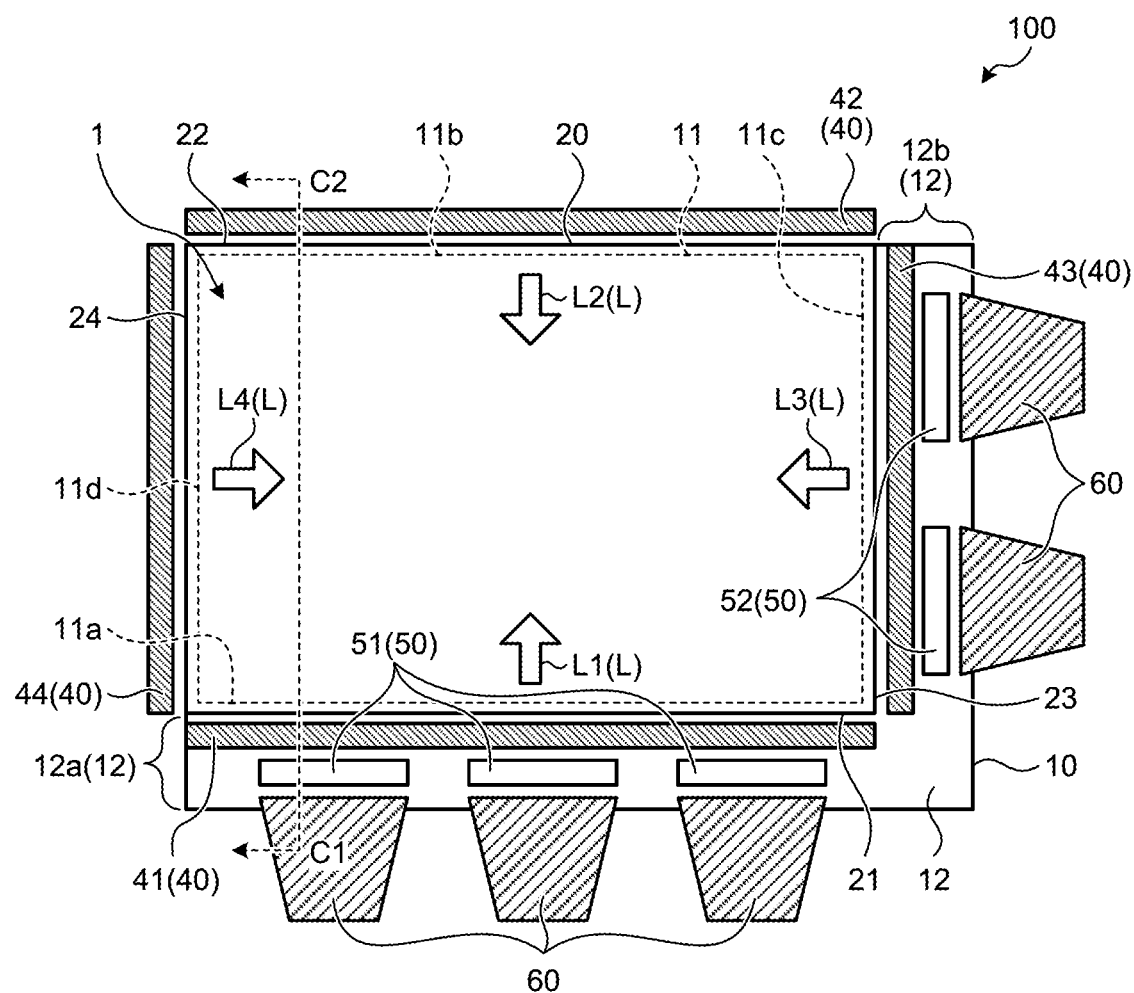
FIG. 1 is a plan view of a display device according to a first embodiment.
Figure 2:
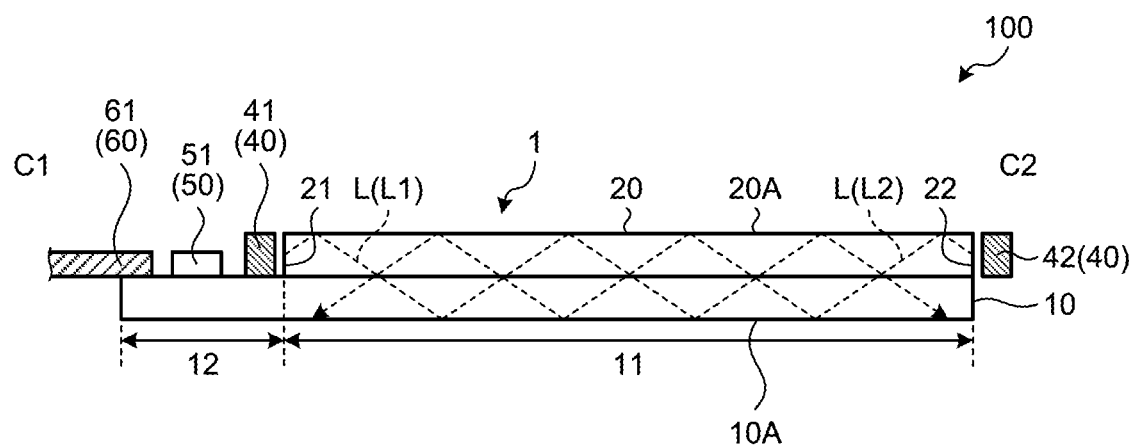
FIG. 2 is a sectional view along a C1-C2 line of FIG. 1.
Figure 3:
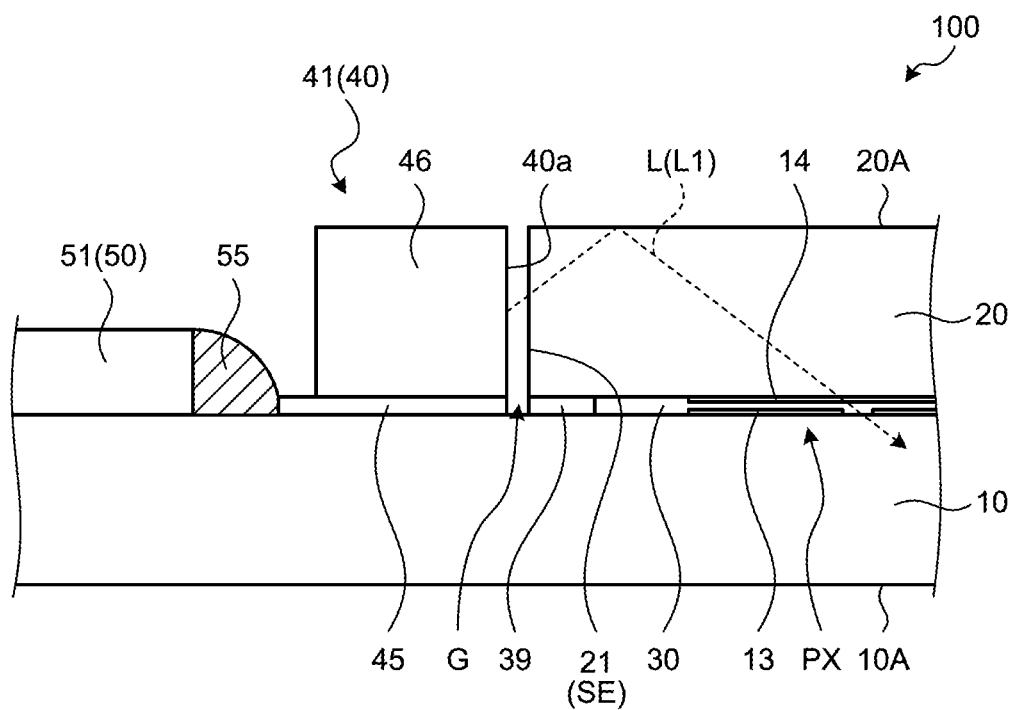
FIG. 3 is a diagram illustrating an enlarged configuration of a vicinity of a terminal portion of FIG. 2.

FIG. 1 is a plan view of a display device 100 according to a first embodiment. FIG. 2 is a sectional view along a C1-C2 line of FIG. 1. FIG. 3 is a diagram illustrating an enlarged configuration of a vicinity of a terminal portion of FIG. 2.

As illustrated in FIGS. 1 and 2, the display device 100 includes a display panel 1, a plurality of light source devices 40, a plurality of semiconductor elements 50, and a plurality of flexible printed circuit substrates (hereinafter, referred to as "FPCs") 60.

The display panel 1 includes a first substrate 10, a second substrate 20, and a liquid crystal layer 30 (see FIG. 3). The first substrate 10 includes a pixel portion 11 and a terminal portion 12. The pixel portion 11 has, for example, a square shape. The terminal portion 12 includes, for example, a first terminal portion 12a along a first side 11a of the pixel portion 11, and a second terminal portion 12b along a third side 11c adjacent to the first side 11a. The second substrate 20 is arranged to face the pixel portion 11. The second substrate 20 is smaller than the first substrate 10. The terminal portion 12 projects outside the second substrate 20.

The display panel 1 may be a passive matrix panel not including a switching element, or may be an active matrix panel including the switching element.

Figure 18:
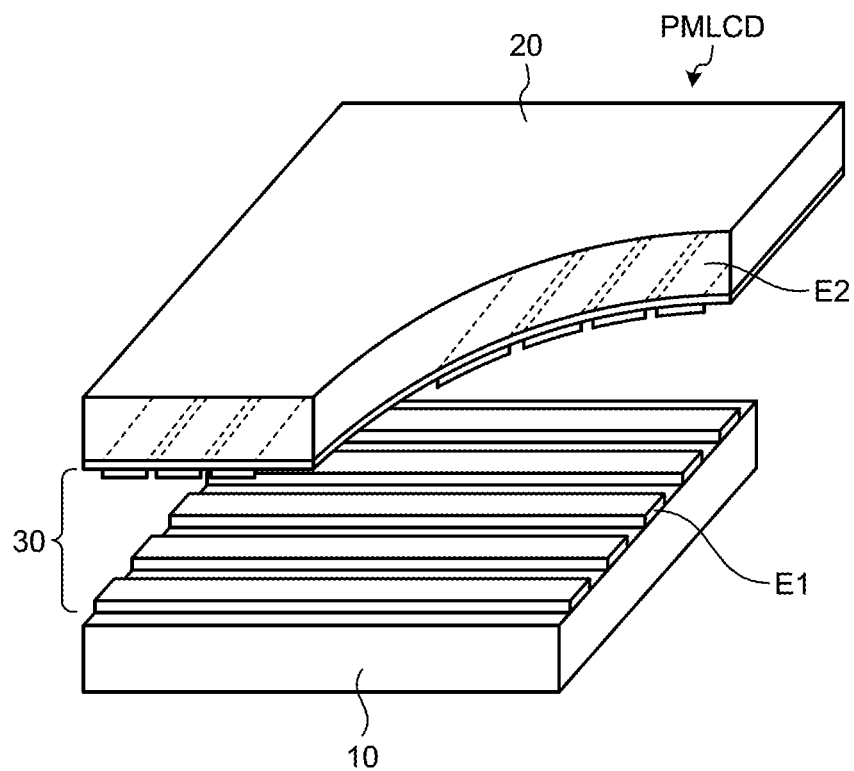
FIG. 18 is a schematic view of a passive matrix panel.
Figure 19:
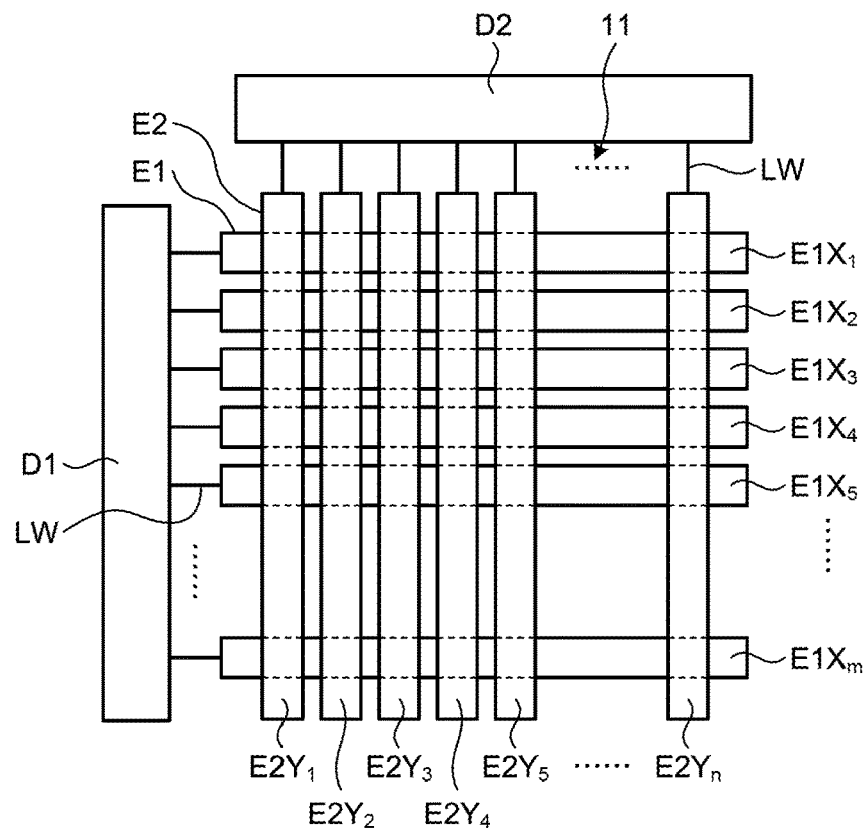
FIG. 19 is an equivalent circuit diagram of the passive matrix panel.

As illustrated in FIGS. 18 and 19, a passive matrix panel PMLCD includes electrodes (first electrodes E1 and second electrodes E2) extending in a longitudinal direction and a cross direction in plan view, and wirings LW electrically coupled to the electrodes. The electrodes are, for example, transparent electrodes, and are arranged to face each other across the liquid crystal layer 30.

A plurality of the first electrodes E1 are supplied with drive signals by a first driver D1 in order of $E1X_1$, $E1X_2$, $E1X_3$, $E1X_4$, $E1X_5$, ... $E1X_n$, for example. A plurality of the second electrodes E2 are supplied with drive signals by a second driver D2 in order of $E2Y_1$, $E2Y_2$, $E2Y_3$, $E2Y_4$, $E2Y_5$, ... $E2Y_n$. A region where the liquid crystal layer 30 is driven by one first electrode and one second electrode is one sub-pixel. A plurality of the sub-pixels arranged in a matrix manner form the pixel portion 11.

Figure 20:
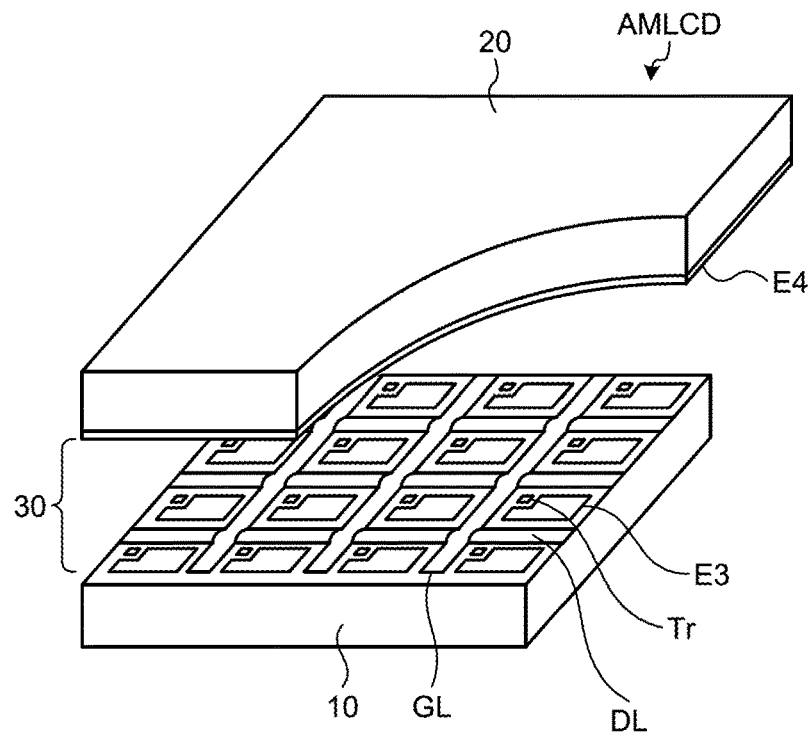
FIG. 20 is a schematic view of an active matrix panel.
Figure 21:
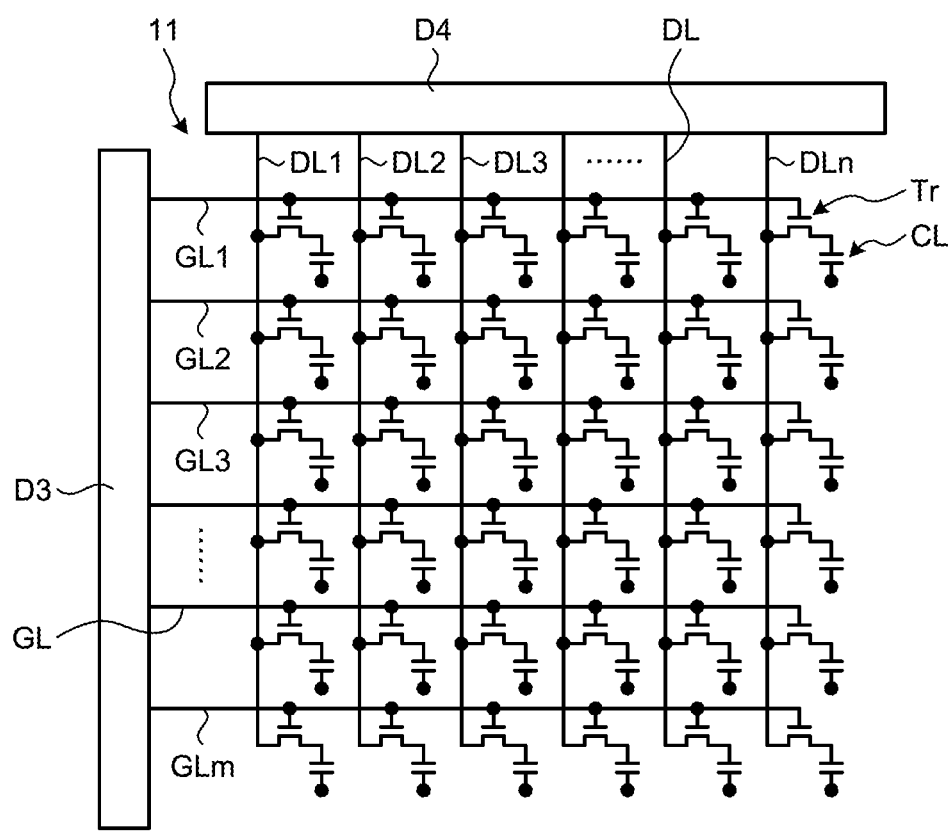
FIG. 21 is an equivalent circuit diagram of the active matrix panel.

As illustrated in FIGS. 20 and 21, in a case where the display panel 1 is an active matrix panel AMLCD, the display panel 1 includes data lines DL and gate lines GL extending in a longitudinal direction and a cross direction in plan view, and switching elements Tr in intersection portions of the data lines DL and the gate lines GL.

Pixel electrodes E3 are respectively coupled to the switching elements Tr. The first substrate 10 is provided with a plurality of the pixel electrodes E3 in a matrix manner. The plurality of gate lines GL are supplied with gate signals by a third driver D3 in order of GL1, GL2, GL3, GL4, GL5, ... GLm, for example. The plurality of data lines DL are supplied with image signals by a fourth driver D4 in order of DL1, DL2, DL3, DL4, DL5, ... DLn, for example.

The second substrate 20 is provided with a common electrode E4 common to the pixel electrodes E3. The image signal (drive voltage) supplied to the pixel electrode E3 through the switching element Tr is held in a capacitive element CL formed of the pixel electrode E3 and the common electrode E4. A region where the liquid crystal layer 30 is driven by each of the pixel electrodes E3 and the common electrode E4 is one sub-pixel. A plurality of the sub-pixels arranged in a matrix manner form the pixel portion 11.

As the switching element, a thin film transistor may be used. Examples of the thin film transistor include a bottom gate transistor and a top gate transistor. Further, for a semiconductor layer of the thin film transistor, amorphous silicon, polycrystal silicon, or an oxide semiconductor may be used. In the present embodiment, the active matrix panel AMLCD is used as the display panel 1, and a thin film transistor using amorphous silicon is used as the thin film transistor, for example.

In the terminal portion 12, the wirings from the pixel portion 11 and the plurality of semiconductor elements 50 are electrically coupled. In the present embodiment, for example, as the plurality of semiconductor elements 50, a plurality of first semiconductor elements 51 electrically coupled with the first terminal portion 12a, and a plurality of second semiconductor elements 52 electrically coupled with the second terminal portion 12b are provided. The first semiconductor element 51 is, for example, a semiconductor element electrically coupled with the data line. The second semiconductor element 52 is, for example, a semiconductor element electrically coupled with the gate line. The plurality of semiconductor elements 50 are mounted on the terminal portion 12 by a chip on glass (COG) method, for example. The plurality of FPCs 60 corresponding to the semiconductor elements 50 are electrically coupled to the terminal portion 12. The semiconductor element 50 is electrically coupled with an external device through the corresponding FPC 60.

Note that the wirings from the pixel portion 11 refer to one or both of electrodes and wirings extending in the longitudinal direction and the cross direction in plan view in a case where the display panel 1 is the passive matrix panel. Further, the wirings from the pixel portion 11 refer to one or both of gate lines and data lines in a case where the display panel 1 is the active matrix panel. The gate line and the data line may be electrically coupled with one semiconductor element.

The plurality of light source devices 40 are provided around the pixel portion 11. The light source device 40 irradiates the pixel portion 11 with light L. In the present embodiment, for example, as the plurality of light source devices 40, a first light source device 41, a second light source device 42, a third light source device 43, and a fourth light source device 44 are provided. The first light source device 41 is arranged in the first terminal portion 12a. The second light source device 42 is arranged in a position facing the first light source device 41 across the pixel portion 11. The third light source device 43 is arranged in the second terminal portion 12b. The fourth light source device 44 is arranged in a position facing the third light source device 43 across the pixel portion 11.

The first light source device 41 is arranged along the first side 11a of the pixel portion 11, and irradiates a first end surface 21 of the second substrate 20 with first light L1. The second light source device 42 is arranged along the second side 11b of the pixel portion 11, and irradiates a second end surface 22 of the second substrate 20 with second light L2. The third light source device 43 is arranged along a third side 11c of the pixel portion 11, and irradiates a third end surface 23 of the second substrate 20 with third light L3. The fourth light source device 44 is arranged along a fourth side 11d of the pixel portion 11, and irradiates a fourth end surface 24 of the second substrate 20 with fourth light L4.

As illustrated in FIG. 3, the light source device 40 includes an FPC 45 adhering to the terminal portion 12, and a plurality of light sources 46 mounted on the FPC 45. The plurality of light sources 46 are arranged along an outer periphery of the pixel portion 11. As the light source 46, a light emitting diode is used, for example. The light source device 40 is arranged to face the end surface of the second substrate 20 in a state where a light irradiation surface 40a faces the end surface of the second substrate 20. The end surface of the second substrate 20, the end surface facing the light irradiation surface 40a, is a light incident surface SE that the light L enters. A gap is provided between the light irradiation surface 40a and the light incident surface SE. The gap is an air layer G. The light L radiated from the light source device 40 is propagated in a direction away from the light incident surface SE while reflected at an outer surface 10A (a surface on an opposite side of the liquid crystal layer 30 side) of the first substrate 10 and an outer surface 20A of the second substrate 20.

As illustrated in FIG. 1, the first semiconductor element 51 is arranged on an opposite side of the pixel portion 11 side across the first light source device 41. The first light L1 is radiated only on the pixel portion 11 side, and is not radiated on the first semiconductor element 51 side. Therefore, the first semiconductor element 51 is less likely to malfunction by the first light L1. Similarly, the second semiconductor element 52 is arranged on an opposite side of the pixel portion 11 side across the third light source device 43. The third light L3 is radiated only on the pixel portion 11 side, and is not radiated on the second semiconductor element 52 side. Therefore, the second semiconductor element 52 is less likely to malfunction by the third light L3.

As illustrated in FIG. 3, a resin 55 having low thermal conductivity is provided between the first semiconductor element 51 and the first light source device 41. The thermal conductivity of the resin 55 is smaller than that of the air. A side surface of the first semiconductor element 51 on the first light source device 41 side is favorably coated with the resin 55 having low thermal conductivity. The resin 55 having low thermal conductivity can prevent conduction of heat from the first light source device 41 to the first semiconductor element 51. Therefore, the first semiconductor element 51 is less likely to be deteriorated by the heat from the first light source device 41.

Although illustration is omitted, a resin having low thermal conductivity is also provided between the second semiconductor element 52 and the third light source device 43. The resin 55 having low thermal conductivity can prevent conduction of heat from the third light source device 43 to the second semiconductor element 52. Therefore, the second semiconductor element 52 is less likely to be deteriorated by the heat from the third light source device 43. Note that examples of the resin 55 having low thermal conductivity include a silicone resin, an epoxy resin, and a UV polymerized resin.

As illustrated in FIGS. 2 and 3, the liquid crystal layer 30 is arranged between the first substrate 10 and the second substrate 20. The liquid crystal layer 30 modulates the light L propagated while reflected between the first substrate 10 and the second substrate 20. A seal material 39 that seals the liquid crystal layer 30 is provided between the first substrate 10 and the second substrate 20. The seal material 39 is provided along the outer periphery of the pixel portion 11 in a frame manner. A plurality of pixels PX are arranged in the pixel portion 11 in a matrix manner. A pixel electrode 13 is provided in each of the pixels PX on the first substrate 10. The plurality of pixels PX may be electrically coupled with the terminal portion 12 through a plurality of routing wirings (not illustrated). The second substrate 20 is provided with a common electrode 14 common to the pixels PX.

An example of the display panel 1 being the passive matrix panel includes a case in which the pixel electrodes 13 and the common electrodes 14 are formed into a strip form, and the pixel electrodes 13 and the common electrodes 14 extend in a longitudinal direction and in a cross direction in plan view, respectively. The pixel electrodes 13 and the common electrodes 14 are coupled with wirings, respectively, and are electrically coupled with the semiconductor element. An example of the display panel 1 being the active matrix panel includes a case in which the switching element, for example, the thin film transistor is electrically coupled with the pixel electrode 13. The gate lines and the data lines are electrically coupled with the semiconductor element.

Figure 4:
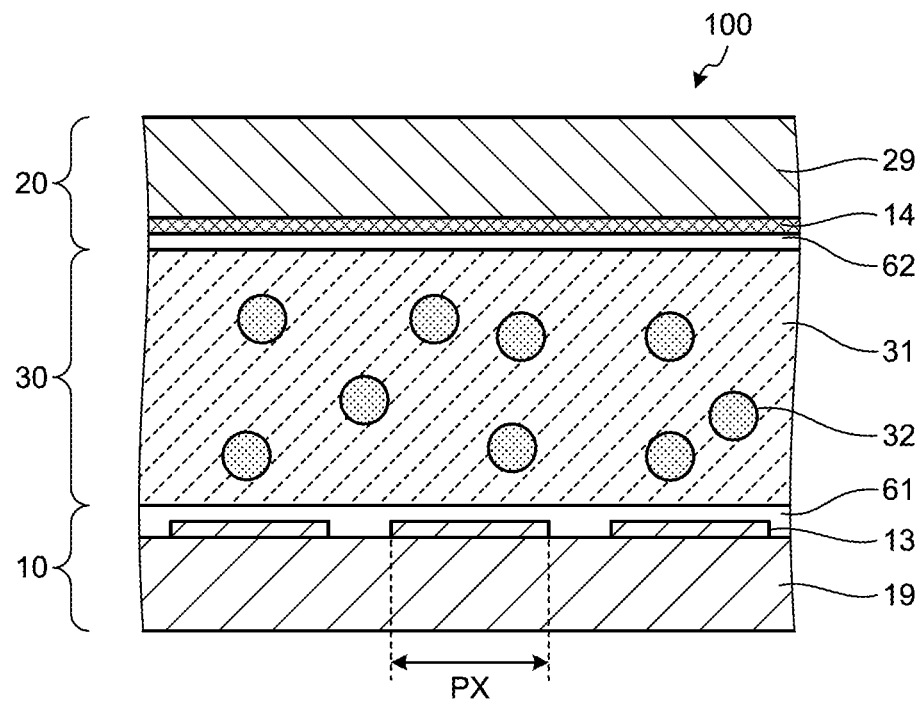
FIG. 4 is a sectional view illustrating a configuration of a liquid crystal layer.
Figure 5:
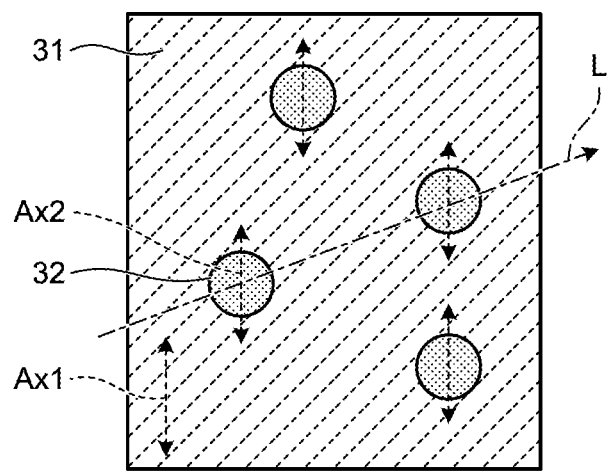
FIG. 5 is a sectional view illustrating the liquid crystal layer in a non-scattering state.
Figure 6:
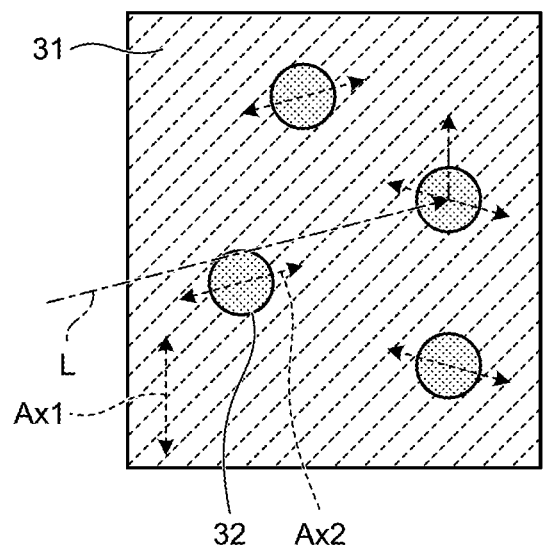
FIG. 6 is a sectional view of the liquid crystal layer in a scattering state.

FIG. 4 is a sectional view illustrating a configuration of the liquid crystal layer 30. FIG. 5 is a sectional view illustrating the liquid crystal layer 30 in a non-scattering state. FIG. 6 is a sectional view illustrating the liquid crystal layer 30 in a scattering state.

As illustrated in FIG. 4, the liquid crystal layer 30 includes a bulk 31 formed of a polymer and a plurality of fine particles 32 dispersed in the bulk 31. The fine particles 32 are formed of liquid crystal. The bulk 31 and the fine particles 32 have optical anisotropy.

The liquid crystal layer 30 is formed by the following method, for example. First, a solution in which liquid crystal is dispersed in a monomer for the polymer is filled between the first substrate 10 and the second substrate 20. The first substrate 10 includes a first base material 19, and the pixel electrodes 13 and a first orientation film 61 provided on the first base material 19. The second substrate 20 includes a second base material 29, and the common electrode 14 and a second orientation film 62 provided on the second base material 29. The first orientation film 61 and the second orientation film 62 are, for example, vertical orientation films.

Next, the monomer is polymerized by ultraviolet rays or heat to form the bulk 31 in a state where the monomer and the liquid crystal are orientated by the first orientation film 61 and the second orientation film 62. Accordingly, the reverse mode liquid crystal layer 30 is formed, in which the liquid crystal is dispersed in gaps of a polymer network formed in a mesh manner.

The orientation of the liquid crystal included in the fine particles 32 is controlled by the voltage applied between the pixel electrode 13 and the common electrode 14. With change of the orientation of the liquid crystal, the degree of scattering of the light L is changed. The liquid crystal layer 30 modulates the light L by changing the degree of scattering of the light L. The brightness of the light L radiated from the display panel 1 to an outside is changed according to the degree of scattering of the light L.

For example, as illustrated in FIG. 5, the direction of an optical axis Ax1 of the bulk 31 and the direction of an optical axis Ax2 of the fine particle 32 are equal to each other in a state where no voltage is applied between the pixel electrode 13 and the common electrode 14. The optical axis Ax2 of the fine particle 32 is parallel to the layer-thickness direction of the liquid crystal layer 30. The optical axis Ax1 of the bulk 31 is parallel to the layer-thickness direction of the liquid crystal layer 30 regardless of existence/non-existence of the voltage.

The ordinary ray refractive index of the bulk 31 and the ordinary ray refractive index of the fine particle 32 are equal to each other. The extraordinary ray refractive index of the bulk 31 and the extraordinary ray refractive index of the fine particle 32 are equal to each other. In the state where no voltage is applied between the pixel electrode 13 and the common electrode 14, a difference in the refractive index between the bulk 31 and the fine particle 32 becomes zero in every direction. The liquid crystal layer 30 is in the non-scattering state where the liquid crystal layer 30 does not scatter the light L. The light L is propagated in the direction away from the light source device 40 while being reflected between the first substrate 10 and the second substrate 20.

As illustrated in FIG. 6, in a state where the voltage is applied between the pixel electrode 13 and the common electrode 14, the optical axis Ax2 of the fine particle 32 is inclined by an electric field occurring between the pixel electrode 13 and the common electrode 14. Since the optical axis Ax1 of the bulk 31 is not changed by the electric field, the direction of the optical axis Ax1 of the bulk 31 and the direction of the optical axis Ax2 of the fine particle 32 are different from each other. The liquid crystal layer 30 is the scattering state where the liquid crystal layer 30 scatters the light L. The light L is propagated while being reflected between the first substrate 10 and the second substrate 20, and is scattered in the pixel PX in the scattering state. The scattered light L is radiated to an outside of the display panel 1, and is observed as image light.

An example in which the first orientation film 61 and the second orientation film 62 are vertical orientation films has been described. However, the first orientation film 61 and the second orientation film 62 may be horizontal orientation films. The first orientation film 61 and the second orientation film 62 may be anything as long as they have a function to orientate the monomer in a predetermined direction in polymerizing the monomer. By this function, the monomer becomes a polymerized polymer in a state of being orientated in the predetermined direction. In a case where the first orientation film 61 and the second orientation film 62 are the horizontal orientation films, the direction of the optical axis Ax1 of the bulk 31 and the direction of the optical axis Ax2 of the fine particle 32 are equal to each other and become a direction perpendicular to a film thickness direction in the state where no voltage is applied between the pixel electrode 13 and the common electrode 14. The direction perpendicular to the film thickness direction corresponds to a direction along a side of the first substrate 10 in a plan view.

In the display device 100 of the above-described present embodiment, the first light L1 from the first light source device 41 does not directly enter the first semiconductor element 51. Further, the third light L3 from the third light source device 43 does not directly enter the second semiconductor element 52. Therefore, the first light source device 41 and the third light source device 43 can be arranged in the terminal portion 12 while suppressing malfunction of the first semiconductor element 51 and the second semiconductor element 52. According to this configuration, the positions of the light source devices 40 are not limited by the position of the terminal portion 12, and thus the degree of freedom of arrangement of the light source devices 40 is high. Therefore, for example, the plurality of light source devices 40 can be symmetrically arranged around the pixel portion 11. In this configuration, the entire pixel portion 11 is uniformly irradiated with the light L, and thus brightness of the pixel portion 11 is improved, and uniformity of the brightness is increased.

Figure 7:
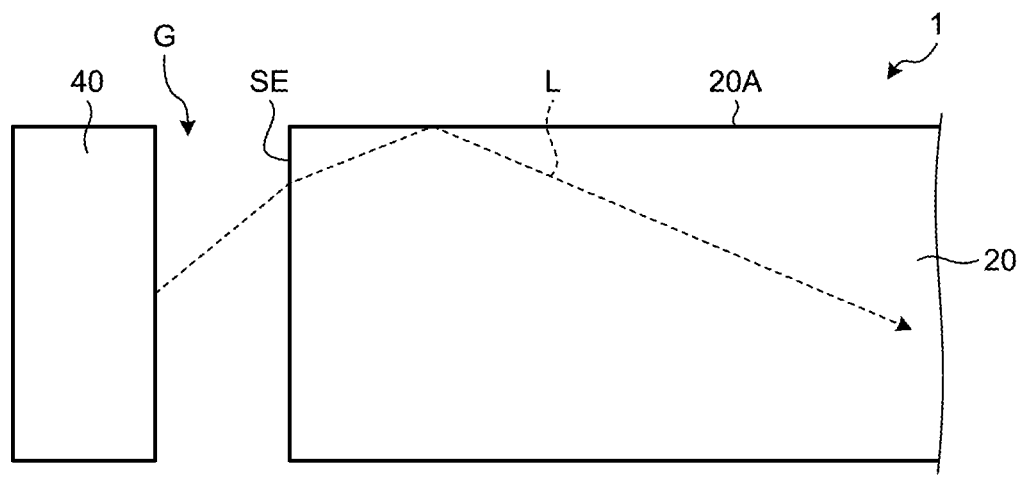
FIG. 7 is a diagram for describing behavior of incident light in a case where there is a gap between a light source device and a light incident surface.
Figure 8:
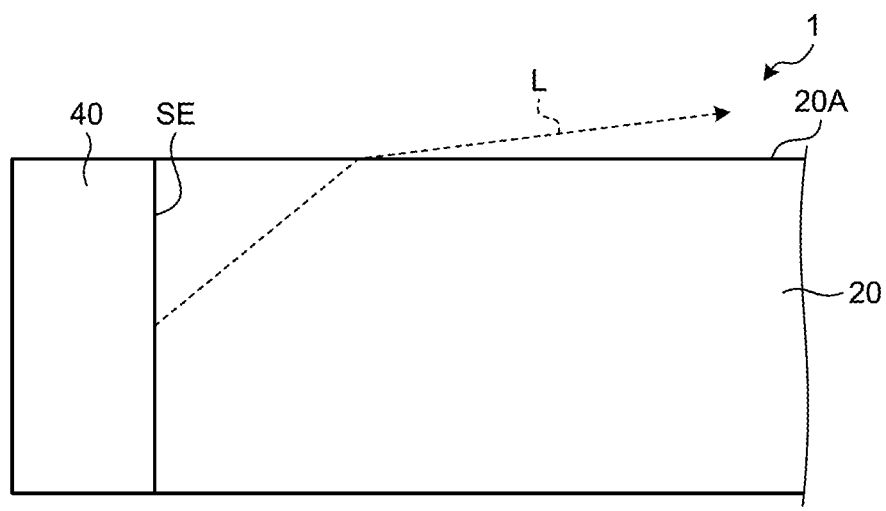
FIG. 8 is a diagram for describing behavior of incident light in a case where there is no gap between the light source device and the light incident surface.

In the present embodiment, as illustrated in FIG. 7, the air layer G is provided between the light source device 40 and the light incident surface SE of the display panel 1. The light L emitted from the light source device 40 enters the light incident surface SE of the display panel 1 through the air layer G. The light L is refracted at the light incident surface SE, and enters the outer surface 20A of the second substrate 20 at a shallow angle. Therefore, the light L is less likely to leak outside the display panel 1 from the outer surface 20A. For example, as illustrated in FIG. 8, in a case where the light source device 40 and the light incident surface SE are in contact with each other, the light L emitted from the light source device 40 enters the outer surface 20A without being refracted at the light incident surface SE. Therefore, the angle to enter the outer surface 20A becomes large. Therefore, the light L may leak outside the display panel 1 without being totally reflected at the outer surface 20A. In the present embodiment, the amount of the light L leaking outside the display panel 1 is small, and thus a bright image can be obtained.

Second Embodiment

Figure 9:
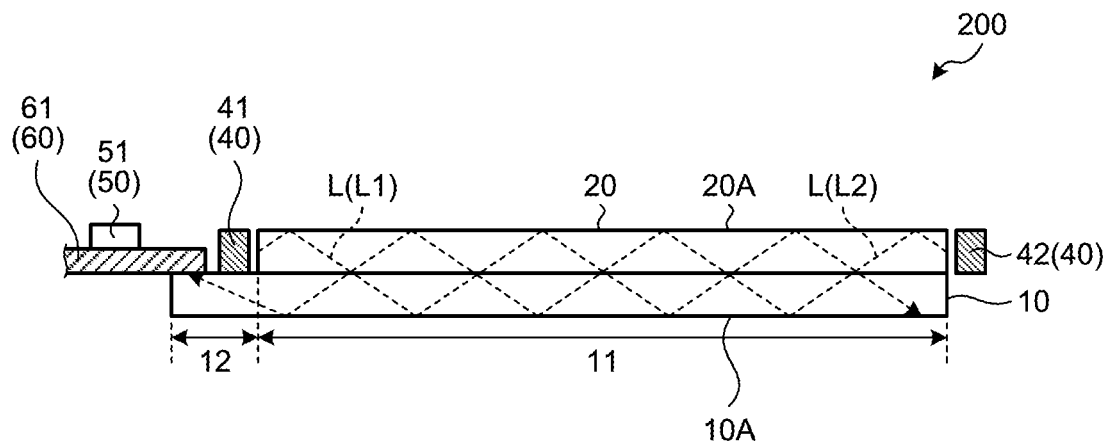
FIG. 9 is a sectional view of a display device according to a second embodiment.

FIG. 9 is a sectional view of a display device 200 according to a second embodiment. In the present embodiment, a configuration element common to the first embodiment is denoted with the same reference sign, and detailed description is omitted.

A different point in the present embodiment from the first embodiment is that a semiconductor element 50 is mounted on an FPC 60. A display method in a display panel 1 is the same as that of the first embodiment. That is, as illustrated in FIG. 5, a liquid crystal layer 30 is in a non-scattering state in which light L is not scattered when no voltage is applied between pixel electrodes 13 and a common electrode 14. The light L is propagated in a direction away from a light source device 40 while reflected between a first substrate 10 and a second substrate 20. As illustrated in FIG. 6, the liquid crystal layer 30 is in a scattering state in which the light L is scattered when a voltage is applied between the pixel electrodes 13 and the common electrode 14. The light L is propagated while being reflected between the first substrate 10 and the second substrate 20, and is scattered in a pixel PX in a scattered state. The scattered light L is radiated to an outside the display panel 1, and is observed as image light.

According to this configuration, the light L from the light source device 40 can be suppressed from entering a semiconductor element 50. Therefore, the light source device 40 can be arranged in the terminal portion 12 while suppressing malfunction of the semiconductor element 50. Further, in the present embodiment, the semiconductor element 50 is mounted on the FPC 60, and thus a distance between the semiconductor element 50 and the light source device 40 is large. Therefore, the semiconductor element 50 is less likely to be deteriorated by heat from the light source device 40.

Further, the FPC 60 is formed of polyimide or the like, and optical transmittance of the FPC 60 is smaller than optical transmittance of the first substrate 10. Therefore, a part of the light L reflected at an outer surface 10A of the first substrate 10 and going toward the semiconductor element 50 is shielded by the FPC 60. Therefore, malfunction of the semiconductor element 50 is suppressed.

Third Embodiment

Figure 10:
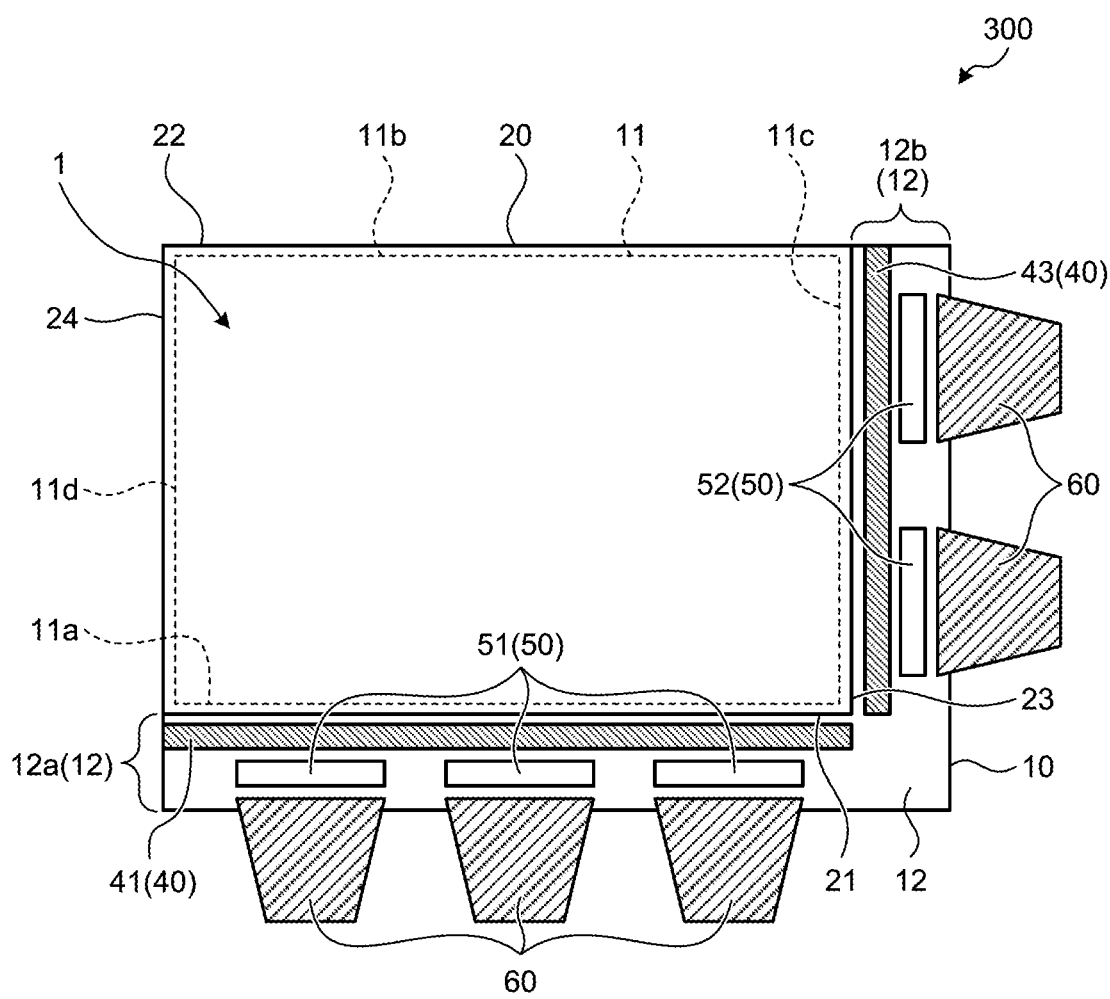
FIG. 10 is a plan view of a display device according to a third embodiment.

FIG. 10 is a plan view of a display device 300 according to a third embodiment. In the present embodiment, a configuration element common to the first embodiment is denoted with the same reference sign, and detailed description is omitted.

A different point in the present embodiment from the first embodiment is that light source devices 40 are provided only to a terminal portion 12. No light source devices 40 are provided outside a first substrate 10.

In the present embodiment, for example, as a plurality of the light source devices 40, a first light source device 41 and a third light source device 43 are provided. First light L1 radiated from the first light source device 41 travels from a first side 11a toward a second side 11b. Third light L3 radiated from the third light source device 43 travels from a third side 11c to a fourth side 11d.

First semiconductor elements 51 are not provided in directions into which the first light L1 and the third light L3 are propagated. Second semiconductor elements 52 are not provided in directions into which the first light L1 and the third light L3 are propagated. Therefore, occurrence of malfunction in the first semiconductor elements 51 and the second semiconductor elements 52 can be suppressed.

Further, in this configuration, all of the light source devices 40 are put together on the first substrate 10. Therefore, a display panel 1 and the light source devices 40 can be integrally treated, and conveyance and assembly work become easy. Further, all of the light source devices 40 are fixed in a state where the light source devices 40 are positioned to the second substrate 20. Therefore, in a case where the display device 300 is accommodated in a case, it is not necessary to provide a mechanism to position the light source devices 40 in the case. Therefore, the structure of the case can be simplified.

Fourth Embodiment

Figure 11:
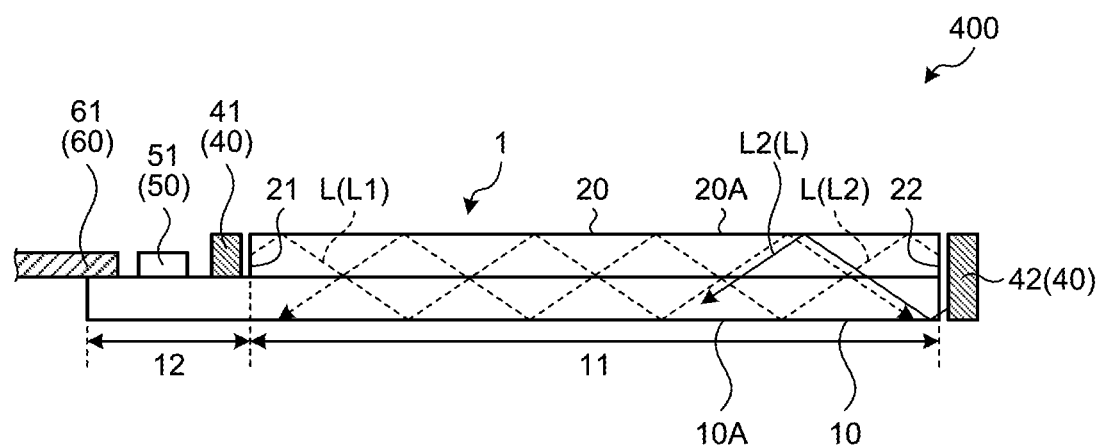
FIG. 11 is a sectional view of a display device according to a fourth embodiment.

FIG. 11 is a sectional view of a display device 400 according to a fourth embodiment. In the present embodiment, a configuration element common to the first embodiment is denoted with the same reference sign, and detailed description is omitted.

A different point in the present embodiment from the first embodiment is that light source devices 40 not arranged in a terminal portion 12 have a height comparable to the thickness of a display panel 1. For example, a second light source device 42 and a fourth light source device 44 have a height comparable to the thickness of the display panel 1.

The second light source device 42 and the fourth light source device 44 are arranged to face both of a first substrate 10 and a second substrate 20. The second light source device 42 and the fourth light source device 44 allow light L to enter both of an end surface of the first substrate 10 and an end surface of the second substrate 20 at the same time. Therefore, an amount of the light L entering the display panel 1 becomes large, and a bright image can be obtained.

Fifth Embodiment

Figure 12:
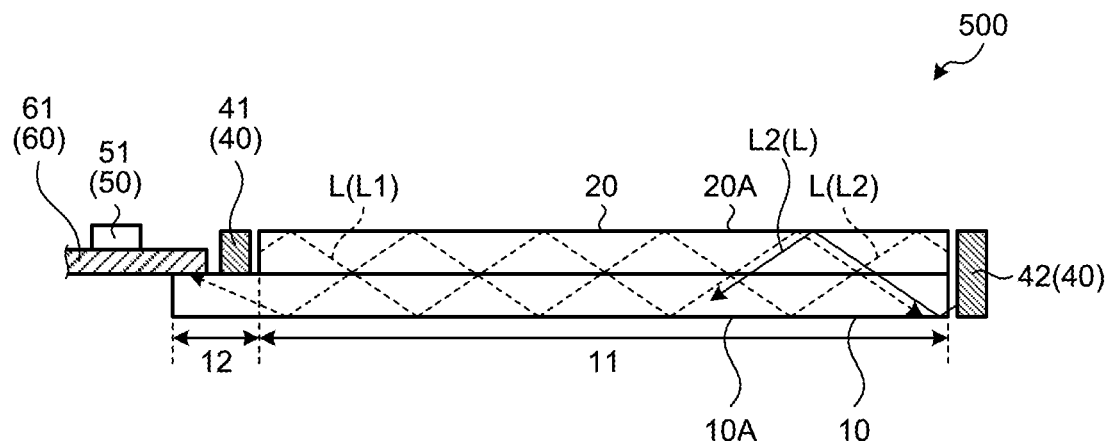
FIG. 12 is a sectional view of a display device according to a fifth embodiment.

FIG. 12 is a sectional view of a display device 500 according to a fifth embodiment. In the present embodiment, a configuration element common to the second embodiment is denoted with the same reference sign, and detailed description is omitted.

A different point in the present embodiment from the second embodiment is that light source devices 40 not arranged in a terminal portion 12 have a height comparable to the thickness of a display panel 1. For example, a second light source device 42 and a fourth light source device 44 have a height comparable to the thickness of the display panel 1.

The second light source device 42 and the fourth light source device 44 are arranged to face both of a first substrate 10 and a second substrate 20. The second light source device 42 and the fourth light source device 44 allow light L to enter an end surface of the first substrate 10 and an end surface of the second substrate 20 at the same time. Therefore, an amount of the light L entering the display panel 1 becomes large, and a bright image can be obtained.

Sixth Embodiment

Figure 13:
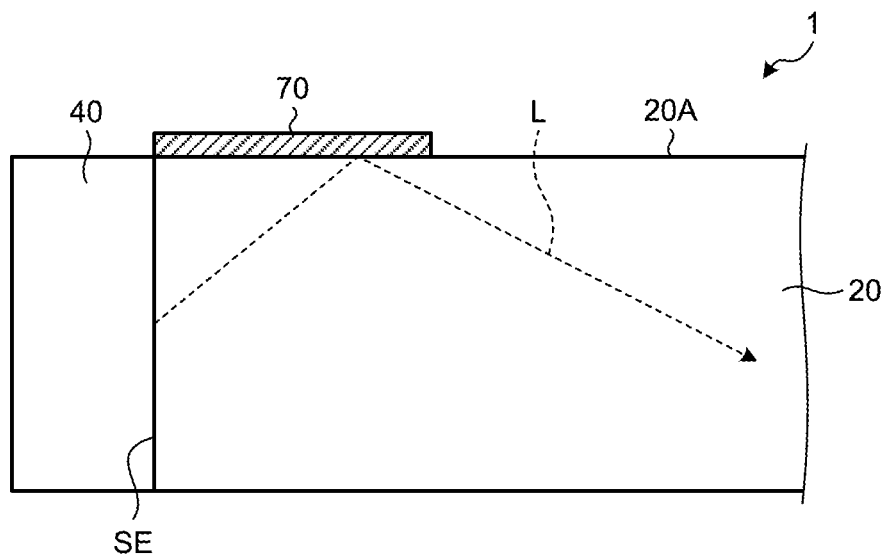
FIG. 13 is a sectional view illustrating a variation of arrangement of a light source device.

FIG. 13 is a sectional view illustrating a variation of arrangement of a light source device 40.

In the first embodiment, the air layer G is provided between the light source device 40 and the light incident surface SE of the display panel 1 to suppress leakage of the light L, which has entered the light incident surface SE, by directly passing through the display panel 1. In the present embodiment, a reflecting layer 70 is provided in a position where leakage of light occurs, in place of providing an air layer G between a light source device 40 and a light incident surface SE. A range to provide the reflecting layer 70 is determined according to a refractive index of a second substrate 20 and a flare angle of light L. The reflecting layer 70 is provided in a range in which the light L enters an outer surface 20A at an angle smaller than a critical angle.

According to this configuration, a distance between the light incident surface SE and the light source device 40 becomes short, and thus a terminal portion 12 can be made small. Therefore, downsizing of a display device can be achieved while suppressing leakage of the light from the display panel 1.

Seventh Embodiment

Figure 14:
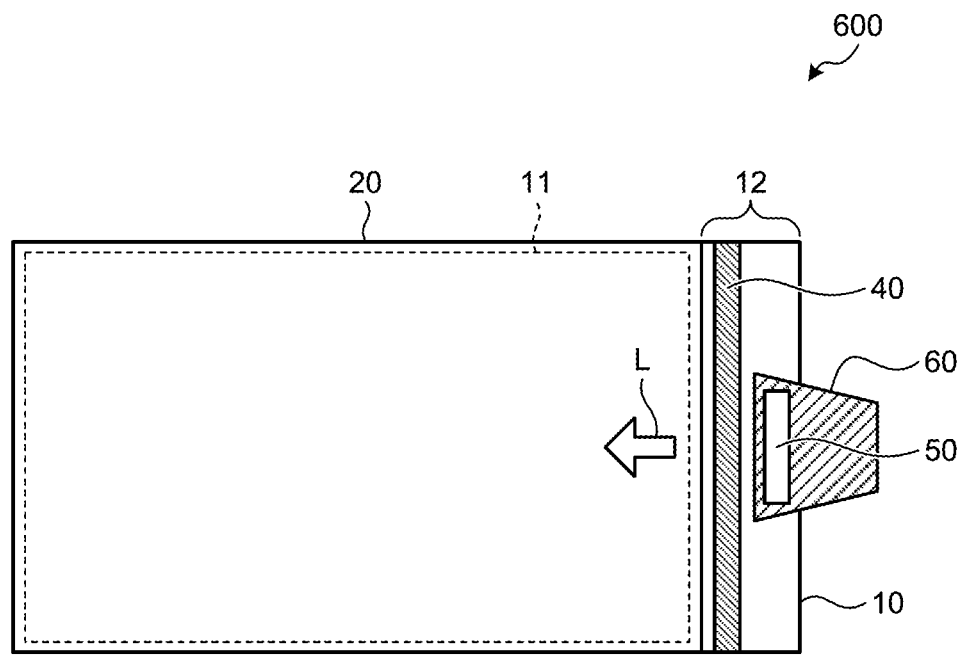
FIG. 14 is a plan view of a display device according to a seventh embodiment.

FIG. 14 is a plan view of a display device 600 according to a seventh embodiment. In the present embodiment, a configuration element common to the first embodiment is denoted with the same reference sign, and detailed description is omitted.

A different point in the present embodiment from the first embodiment is that a terminal portion 12 is provided only to one side of a first substrate 10. A thin film transistor of a pixel portion 11 is a thin film transistor using polycrystal silicon, for example, low temperature poly-silicon (LTPS). A semiconductor element 50 is electrically coupled with gate lines and data lines pulled out from the pixel portion 11. The semiconductor element 50 is mounted on an FPC 60. The light source device 40 is arranged between the pixel portion 11 and the semiconductor element 50, and irradiates the pixel portion 11 with light L.

According to this configuration, the light L from the light source device 40 does not directly enter the semiconductor element 50. Therefore, malfunction of the semiconductor element 50 is suppressed.

Eighth Embodiment

Figure 15:
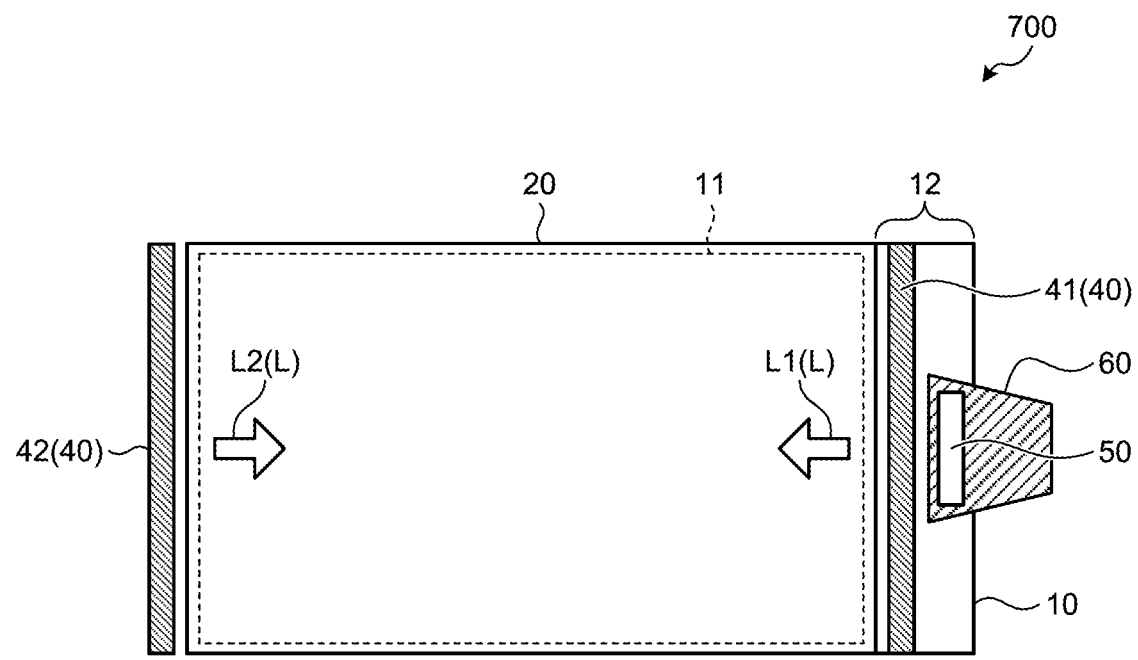
FIG. 15 is a plan view of a display device according to an eighth embodiment.

FIG. 15 is a plan view of a display device 700 according to an eighth embodiment. In the present embodiment, a configuration element common to the seventh embodiment is denoted with the same reference sign, and detailed description is omitted.

In the present embodiment, a plurality of light source devices 40 are provided around a pixel portion 11. For example, as the plurality of light source devices 40, a first light source device 41 and a second light source device 42 are provided. The first light source device 41 is arranged between the pixel portion 11 and a semiconductor element 50. The second light source device 42 is arranged in a position facing the first light source device 41 across the pixel portion 11.

The first light source device 41 irradiates the pixel portion 11 with first light L1. The first light L1 does not directly enter the semiconductor element 50, and thus malfunction of the semiconductor element 50 by the first light L1 is suppressed. Second light L2 radiated from the second light source device 42 is propagated toward the semiconductor element 50 and is attenuated in the process of propagation, and thus malfunction is less likely to occur in the semiconductor element 50. Therefore, the pixel portion 11 can be illuminated by the plurality of light source devices 40 while suppressing malfunction of the semiconductor element 50.

Ninth Embodiment

Figure 16:
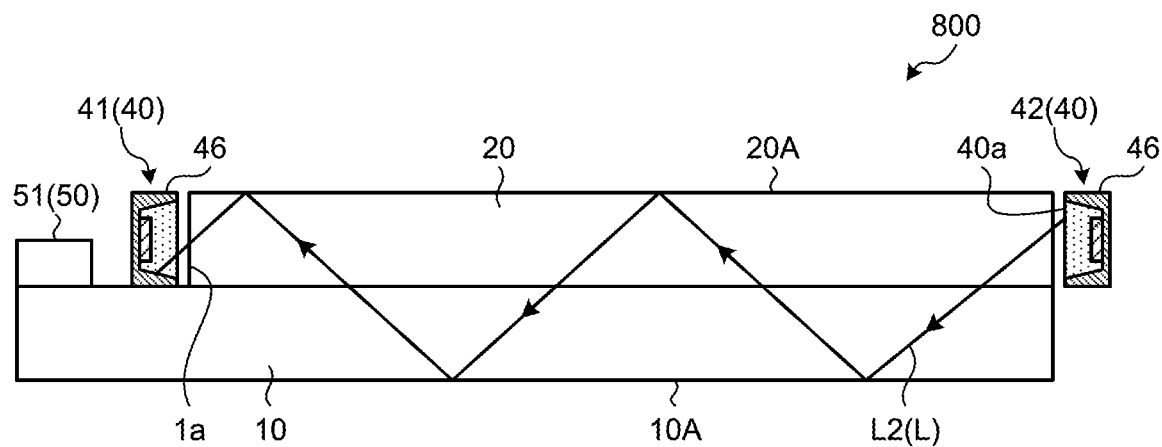
FIG. 16 is a sectional view of a display device according to a ninth embodiment.
Figure 17:
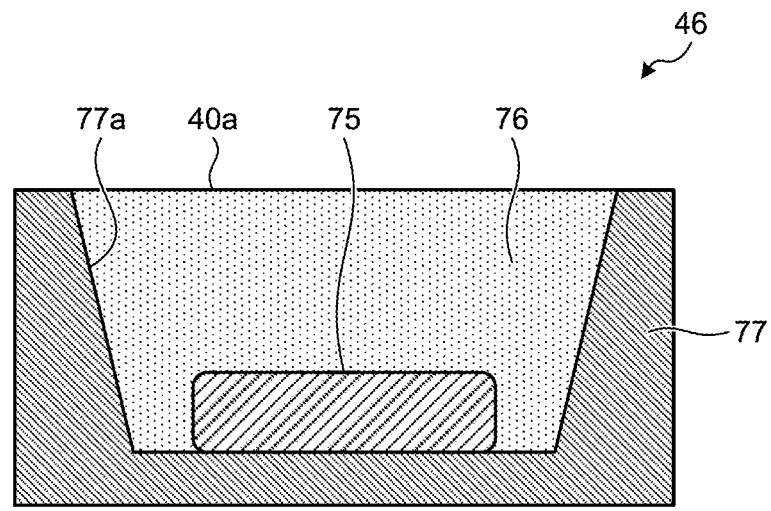
FIG. 17 is a sectional view illustrating a configuration of a light source.

FIG. 16 is a sectional view of a display device 800 according to a ninth embodiment. FIG. 17 is a sectional view illustrating a configuration of a light source 46. In the present embodiment, a configuration element common to the first embodiment is denoted with the same reference sign, and detailed description is omitted.

As illustrated in FIG. 17, the light source 46 includes a luminous body 75, a fluorescent body 76, and a reflector 77. The reflector 77 includes a recess 77a that accommodates the luminous body 75 and the fluorescent body 76. The luminous body 75 is fixed to a bottom surface of the recess 77a. The luminous body 75 is covered with the fluorescent body 76. The fluorescent body 76 absorbs a part of light radiated from the luminous body 75, and emits light having a different wavelength from a wavelength of the radiated light of the luminous body 75. The luminous body 75 emits, for example, blue light. The fluorescent body 76 converts the blue light into yellow light, for example. Accordingly, white light L is radiated from the light source device 40. A surface of the fluorescent body 76 exposed in the recess 77a is a light irradiation surface 40a.

As illustrated in FIG. 16, a first semiconductor element 51(50) is arranged in a position where shadow of second light L2 is formed by the first light source device 41, for example. The second light L2 propagated inside the display panel 1 and emitted from a first end surface 1a is shielded by the first light source device 41. The second light L2 having entered the first light source device 41 is reflected by a reflector 77, and does not enter a first semiconductor element 51. Therefore, malfunction of the first semiconductor element 51 is suppressed. Although illustration is omitted, a second semiconductor element 52 is arranged in a position where shadow of fourth light L4 is formed by a fourth light source device 44. Therefore, the fourth light L4 is suppressed from entering the second semiconductor element 52.

Note that the present embodiment is applied to the first to eighth embodiments.

Favorable embodiments of the present invention have been described. However, the present invention is not limited to these embodiments. The content disclosed in the embodiments is merely examples, various modifications can be made without departing from the points of the present invention. Appropriate modifications made without departing from the points of the present invention obviously belong to the technical scope of the present invention. All of inventions that would be appropriately designed and modified, and implemented by a person skilled in the art on the basis of the above-described invention also belong to the technical scope of the present invention as long as the inventions include the gist of the present invention.

For example, in the above-described embodiment, the terminal portion 12 is provided in the L-shaped manner along the two sides of the pixel portion 11. However, the shape of the terminal portion 12 is not limited thereto. The terminal portion 12 may be provided along one side, or three or more sides of the pixel portion 11. Further, the number of the light source devices 40 is not limited to four or two, and may be one or three. Further, the types and numbers of the semiconductor element 50 are not limited to those described in the above-described embodiments.

The present invention can be widely applied to a display device according to the following aspects.

(1) A display device comprising:
a first substrate including a pixel portion and a terminal portion;
a second substrate arranged to face the pixel portion;
a first light source device arranged in the terminal portion, and irradiating a first end surface of the second substrate with first light;
a liquid crystal layer arranged between the first substrate and the second substrate; and
a semiconductor element arranged on a side opposite to a side of the pixel portion across the first light source device, and electrically coupled with the terminal portion, wherein
the first light is propagated while reflected between the first substrate and the second substrate, and
the liquid crystal layer modulates the propagated first light.

(2) The display device according to (1), comprising:
a second light source device arranged in a position facing the first light source device with the pixel portion between the first and second light source devices, and irradiates a second end surface of the second substrate with second light.

(3) The display device according to (1) or (2), wherein the semiconductor element is mounted in the terminal portion.

(4) The display device according to (3), wherein a resin is provided between the semiconductor element and the first light source device.

(5) The display device according to (1) or (2), comprising:
a flexible printed circuit substrate electrically coupled with the terminal portion, wherein
the semiconductor element is mounted on the flexible printed circuit substrate.

(6) The display device according to (5), wherein optical transmittance of the flexible printed circuit substrate is smaller than optical transmittance of the first substrate.

What is claimed is:
1. A display device comprising:
a first substrate including a pixel portion and a terminal portion;
a second substrate arranged to face the pixel portion of the first substrate, the second substrate including a first end surface and a second end surface opposed to the first end surface;
a liquid crystal layer arranged between the first substrate and the second substrate;
a flexible printed circuit arranged in the terminal portion, and electrically coupled with the terminal portion;
a first light source device arranged between the pixel portion and the flexible printed circuit in the terminal portion, and irradiating the first end surface of the second substrate with first light; and
a semiconductor element arranged between the first light source device and the flexible printed circuit in the terminal portion, and electrically coupled with the terminal portion,
wherein:
the first light from the first light source device is propagated from the first end surface to the second end surface of the second substrate, while the first light being reflected between the first substrate and the second substrate via the liquid layer interposed therebetween;

the liquid crystal layer, which includes polymer and fine liquid crystal particles, modulates the propagated first light from the first light source device; and the polymer and the fine particles have optical anisotropy.

2. The display device according to claim 1, further comprising:

a second light source device irradiating the second end surface with second light, the second light source device being arranged in a position facing the first light source device, and the pixel portion being disposed between the first light source device and second light source device.

3. The display device according to claim 1, wherein the semiconductor element is mounted in the terminal portion.

4. The display device according to claim 3, further comprising a resin disposed between the first light source device and the semiconductor element.

* * * * *